(12) United States Patent
Hirai

(10) Patent No.: US 8,219,634 B2
(45) Date of Patent: Jul. 10, 2012

(54) INFORMATION DISTRIBUTION SYSTEM, AND INFORMATION DISTRIBUTION METHOD

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 10/971,962

(22) Filed: Oct. 22, 2004

(65) Prior Publication Data

US 2005/0144636 A1 Jun. 30, 2005

(30) Foreign Application Priority Data

Oct. 28, 2003 (JP) ................................ P2003-367676

(51) Int. Cl.
G06F 15/16 (2006.01)
(52) U.S. Cl. ........ 709/217; 709/206; 709/207; 709/218; 709/219; 709/230; 709/231
(58) Field of Classification Search .................. 705/5, 6, 705/1, 28, 26, 27, 10, 14; 709/204, 206–207, 709/217–219, 230–236; 725/9, 34, 35, 37, 725/46, 87, 134, 143
See application file for complete search history.

(56) References Cited

U.S. PATENT DOCUMENTS

| | | | | |
|---|---|---|---|---|
| 5,583,763 A | * | 12/1996 | Atcheson et al. | 707/750 |
| 5,724,521 A | * | 3/1998 | Dedrick | 705/26 |
| 5,778,187 A | * | 7/1998 | Monteiro et al. | 709/231 |
| 5,983,005 A | * | 11/1999 | Monteiro et al. | 709/231 |
| 6,434,622 B1 | * | 8/2002 | Monteiro et al. | 709/231 |
| 6,976,082 B1 | * | 12/2005 | Ostermann et al. | 709/231 |
| 7,428,547 B2 | * | 9/2008 | Basso et al. | 707/101 |
| 2001/0007560 A1 | * | 7/2001 | Masuda et al. | 370/401 |
| 2002/0007418 A1 | * | 1/2002 | Hegde et al. | 709/231 |
| 2002/0042834 A1 | * | 4/2002 | Kremens et al. | 709/231 |
| 2002/0082901 A1 | * | 6/2002 | Dunning et al. | 705/10 |
| 2002/0092019 A1 | * | 7/2002 | Marcus | 725/37 |
| 2002/0143973 A1 | * | 10/2002 | Price | 709/231 |
| 2002/0143975 A1 | * | 10/2002 | Kimura et al. | 709/231 |
| 2002/0194619 A1 | * | 12/2002 | Chang et al. | 725/134 |
| 2003/0229537 A1 | * | 12/2003 | Dunning et al. | 705/10 |

FOREIGN PATENT DOCUMENTS

| | | |
|---|---|---|
| JP | 2002-091863 | 3/2002 |
| JP | 2002-149688 | 5/2002 |
| JP | 2002-305734 | 10/2002 |
| JP | 2003-235010 | 8/2003 |
| WO | WO 03/033998 | 4/2003 |

* cited by examiner

Primary Examiner — David Lazaro
Assistant Examiner — Edward Kim
(74) Attorney, Agent, or Firm — K&L Gates LLP

(57) ABSTRACT

Information distribution systems and information distribution methods are provided. In an information distribution system, header files of contents in accordance with a preference of a user of a data terminal are automatically selected, in advance, from a content distribution apparatus and are transmitted to the data terminal, so that probabilities that the header files of the contents have been already stored are very high when the user downloads the content of the body data. If the number of header files to be stored is more than a predetermined number, the most of the header files with respect to the contents of the body data to be downloaded will be in the data terminal. Therefore, on performing a downloading operation, the header files can be played immediately, then subsequently, the downloaded content of the body data are played, whereby the user can appreciate the content which the user desires to view and listen to without waiting time.

11 Claims, 4 Drawing Sheets

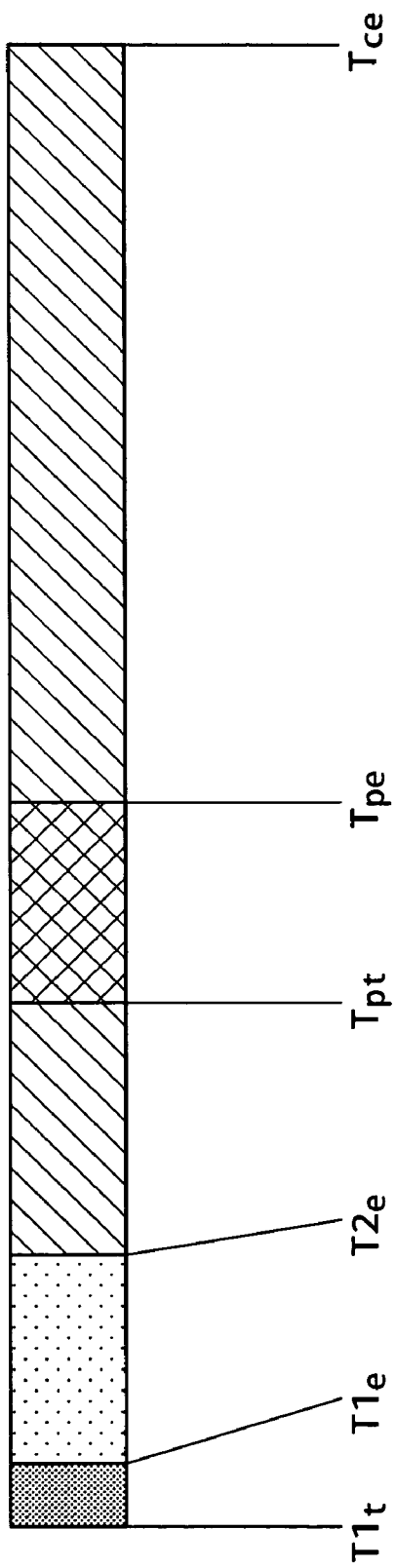

FIG. 3A

|  | LENGTH (SECOND) | CAPACITY MByte (128kbps) |
|---|---|---|
| AUDITION | 30 | 0.48 |
| HEADER | 10 | 0.16 |
| BODY DATA (AVERAGE) | 300 | 4.8 |

FIG. 3B

|  | NUMBER | CAPACITY (MB) |
|---|---|---|
| AUDITION | 100,000 | 48,000 |
| HEADER | 100,000 | 16,000 |
| BODY DATA | 5,000 | 24,000 |
| TOTAL |  | 88,000 |

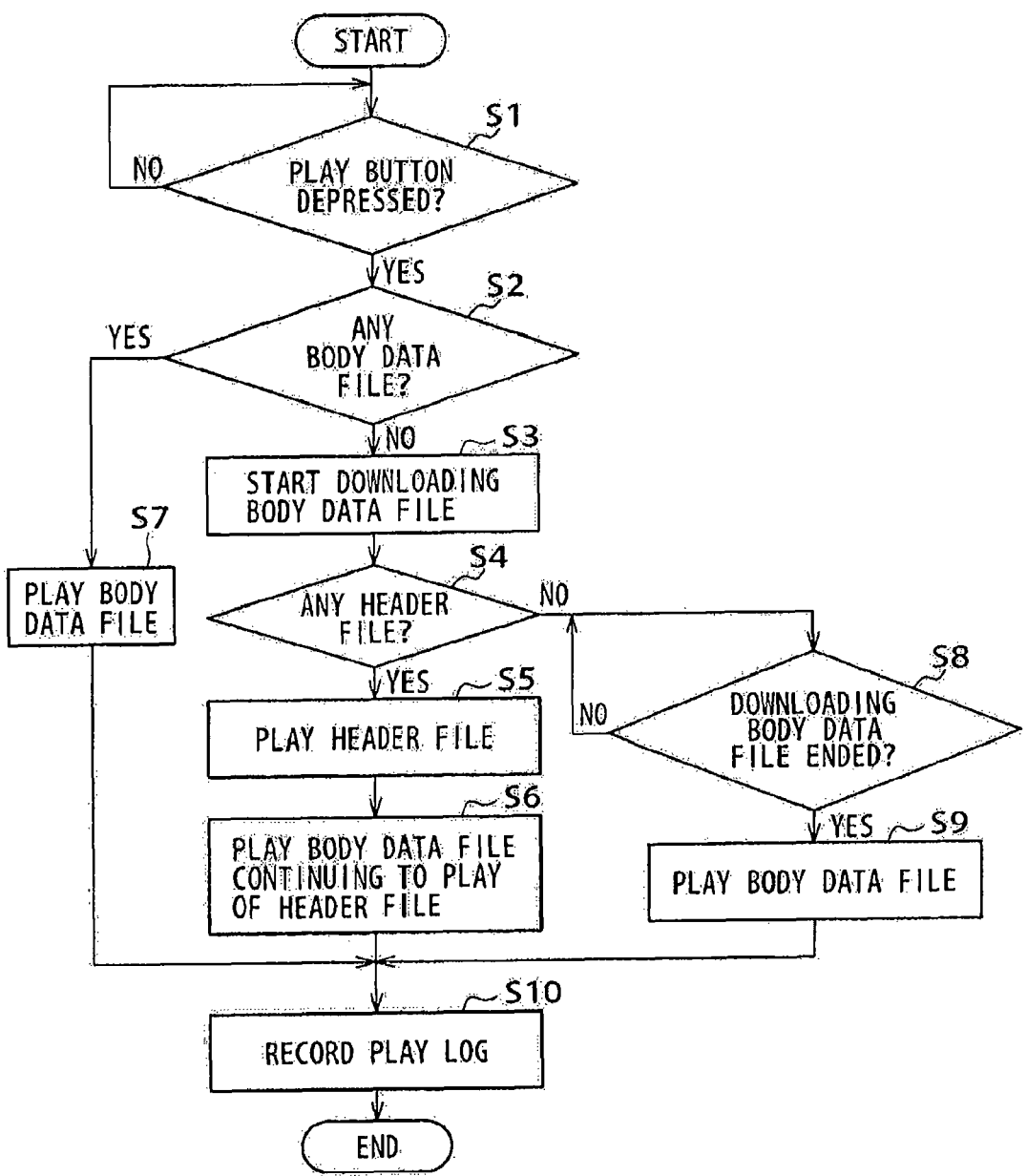

INFORMATION DISTRIBUTION SYSTEM, AND INFORMATION DISTRIBUTION METHOD

CROSS REFERENCE TO RELATED APPLICATION

This application claims priority from Japanese Priority Document No. 2003-367676, filed on Oct. 28, 2003 with the Japanese Patent Office, which document is hereby incorporated by reference.

BACKGROUND OF THE INVENTION

The present invention relates to an information distribution system and an information distribution method for distributing contents such as video images, music, and the like, to a data terminal through a network.

In recent years, because of the wide spread of networks such as the Internet, it has been possible to easily access distribution sites which are distributing video images, music, and the like from a data terminal such as a personal computer, so as to receive desired music and video image to be played right there on the data terminal of a client side, by way of stream distribution, or by acquiring them by downloading.

For example, when a user would like to listen to music, the user accesses a homepage of a music distribution site and inputs a title of a music piece to which the user would like to listen, for example, thereby a plurality of music titles of music pieces corresponding to the title will be displayed for each musician. In this case, if the user pushes an audition button for the music piece of the musician to whom the user would like to listen, an audition music piece will be provided by way of the streaming distribution through the Internet from the distribution site to a user's terminal, and will be played for approximately 30 seconds, for example. As the result of the audition, if the user wants to listen to the music piece completely, the user pushes a listening button, then the downloading of whole this music piece will start. If the user waits for one or two minutes for completely downloading the music piece, although depending on a line speed and a capacity of the whole music piece, then the play back of the body data will be started.

However, if it requires somewhat waiting time to start to play the body data as described above, a user's interest in listening music will be spoiled, and this may be a factor causing a listener to change his or her mind such as to listen to only one piece of music. On this account, the listener will give up listening to other pieces of music, although the listener is intended to listen to several music pieces at first. In order to avoid this situation, there is a method of removing such user's waiting time and playing music smoothly, wherein the header segments of the music pieces (programs) are downloaded, in advance, so as to start to play the header segments immediately after the listening button is pushed, then the completely downloaded body data are played subsequently. See, for example, Japanese Laid-open Patent No. 2002-91863.

However, in the above-mentioned method where the waiting time is removed by downloading the header segments of the programs beforehand as described above, the method has not provide actual services, because it does not describe which program header segment should be downloaded, in advance, and a method required for selecting a particular program in that case.

Further, in television broadcasting system, there are dedicated reception terminals, such as TiVo and RePlay, having a hard disk recording function, and a function to exchange viewing logs etc. with a server side. These are recording services which recognizes user's preferences based on user's program evaluations and viewing log, and automatically records programs which are agreed with the user's preferences among broadcasting programs. However, it is difficult to perfectly recognize the user's preferences, and chances of timely encountering the time when the contents agreed with the user's preferences are being broadcasted are also limited. In contrast, when downloading the contents via a network, there are chances of acquiring a lot of contents which the user feels that they are infinite number of contents and do not need to think about downloading timing. However, it is not easy to locate preferred video images or music contents from these infinite number of contents. Even if the waiting time to start to play the distributed audition piece is reduced to several seconds, it takes considerable waiting time in total to audit an immense number of audition pieces, so that it is not possible to efficiently distribute video images or music contents.

SUMMARY OF THE INVENTION

The present invention relates to an information distribution system and an information distribution method for distributing contents such as video images, music, and the like to a data terminal through a network.

The present invention in an embodiment provides an information distribution system and an information distribution method in which a hit ratio of header files for playing contents, without waiting time, distributed from an information distribution site is raised to a practical level so as to surely appreciate the contents which are desired to be listened to without the waiting time.

In an embodiment, the present invention provides an information distribution system for distributing contents from a content distribution apparatus to a data terminal by way of downloading via a network, in which the content distribution apparatus includes, first preference information storage means for collecting and storing preference information of a user of the above-mentioned data terminal, first selection means for selecting, based on the above-mentioned preference information, a header file assigned to play in the interval between starting downloading a content file to the above-mentioned data terminal and playing these contents at the above-mentioned data terminal, and distribution means for distributing the above-mentioned selected header file, in advance, to the above-mentioned data terminal by downloading via the above-mentioned network.

In the information distribution system in an embodiment, the header files of the contents in accordance with the preference of the user of the data terminal are automatically selected, in advance, from a content distribution apparatus and are transmitted to the data terminal, so that probabilities that the header files of the contents have been already stored are very high when the user downloads the content of the body data. If the number of header files to be stored is more than a predetermined number, the most of the header files with respect to the contents of the body data to be downloaded will be in the data terminal. Therefore, on performing a downloading operation, the header files can be played immediately, then subsequently, the downloaded content of the body data are played, whereby the user can appreciate the content which the user desires to view and listen to without waiting time.

An information distribution system in an embodiment is provided for distributing a content from a content distribution apparatus to a data terminal by way of downloading via a network, in which the data terminal includes second preference information storage mechanism for collecting and storing preference information of a user of the data terminal, second selection mechanism for selecting, based on the above-mentioned preference information, a header file assigned to play in the interval between issuing, by way of the above-mentioned content distribution apparatus, of a request from the above-mentioned data terminal for downloading a content file and downloading and playing the relevant contents, request mechanism for requesting, in advance, the above-mentioned selected header file from the above-mentioned content distribution apparatus via the above-mentioned network, and storage mechanism for storing the header files distributed from the above-mentioned content distribution apparatus.

In the information distribution system in an embodiment, the data terminal automatically selects the header file of the contents in accordance with the user's preference, in advance, a transmission request for the selected header file is outputted to the content distribution apparatus, and the header file transmitted from the content distribution apparatus is then stored, so that probabilities that the header files of the contents are already stored are very high when the user downloads the content of the body data. If the number of header files to be stored is more than a predetermined number, the most of the header files with respect to the contents of the body data to be downloaded will be in the data terminal. Therefore, on performing a downloading operation, the header files are can played immediately, then subsequently, the downloaded contents of the body data are played, whereby the user can appreciate the content which the user desires to view and listen to without waiting time.

An information distribution method in an embodiment is further provided for distributing contents from a content distribution apparatus to a data terminal by way of downloading via a network. The content distribution apparatus includes collecting and storing preference information of a user of the above-mentioned data terminal, a step of selecting, based on the above-mentioned preference information, a header file assigned to playback in the interval between starting downloading a content file to the above-mentioned data terminal and playing these contents at the above-mentioned data terminal, and a step of downloading, in advance, the above-mentioned selected header file to the above-mentioned data terminal so as to distribute it via the above-mentioned network.

In the information distribution method in an embodiment, the header files of the contents in accordance with the preference of the user of the data terminal are automatically selected, in advance, from a content distribution apparatus and transmitted to the data terminal, so that probabilities that the header files of the contents are already stored are very high when the user downloads a content of the body data. If the number of header files to be stored is more than a predetermined number, the most of the header files with respect to the contents of the body data to be downloaded will be in the data terminal. Therefore, on performing a downloading operation, the header file can be played immediately, then subsequently, the downloaded content of the body data are played, whereby the user can appreciate the content which the user desires to view and listen to without waiting time.

An information distribution method in an embodiment is provided for distributing a content from a content distribution apparatus to a data terminal by way of downloading via a network, in which the data terminal includes collecting and storing preference information of a user of the above-mentioned data terminal, selecting a header file assigned to playback in the interval between issuing, by way of the above-mentioned content distribution apparatus, a request of the above-mentioned data terminal for downloading a content file, and downloading and playing the relevant contents, based on the above-mentioned preference information, a step of requesting, in advance, the above-mentioned selected header file from the above-mentioned content distribution apparatus via the above-mentioned network, and a step of storing the header file distributed from the above-mentioned content distribution apparatus.

In the information distribution method in an embodiment, the data terminal automatically selects the header file of the contents in accordance with the user's preference, in advance, a transmission request for the selected header file is outputted to the content distribution apparatus, and the header file transmitted from the content distribution apparatus is stored, so that probabilities that the header files of the contents are already stored are very high when the user downloads a content of the body data If the number of header files to be stored is more than a predetermined number, the most of the header files with respect to the contents of the body data to be downloaded will be in the data terminal. Therefore, on performing a downloading operation, the header file can be played immediately, then subsequently, the downloaded content of the body data are played, whereby the user can appreciate the content which the user desires to view and listen to without waiting time.

In an embodiment, the header files of the contents in accordance with the user's preference are received and stored from the content distribution apparatus. When the body data file is downloaded from the content distribution apparatus so as to be played, the header file (stored beforehand) of the body data to be downloaded can be played immediately. During the playback, the body data file is downloaded, and subsequently played, so that the music piece which a user wants to download and to play can be played without waiting time. Further, since more than the predetermined number of header files based on the user's preference are stored, the header files with respect to the contents of the body data to be downloaded are almost in the data terminal, and the most of all of the download contents can be played without waiting time.

Furthermore, the music pieces in accordance with the user's preference are automatically selected from the huge number of music pieces stored in the data terminal so as to be played one after another, so that the stored music pieces can be enjoyed without a troublesome operation of selecting every music piece which the user wants to play. In addition, it is often the case that the played music pieces are what the user just wants to listen to, so that the stored music piece can be played and effectively used at the right time. Moreover, the huge number of music pieces in accordance with the user's preference stored in the above-mentioned data terminal are received and stored beforehand from the content distribution apparatus via the network, thus performing very efficient distribution. Furthermore, since a viewer or a listener can access infinite number of contents sensuously and instantaneously only by selecting one out of the audition pieces and can appreciate it without waiting time, it is not necessary to locate a favorite content over a network, or to go to a shop to buy one, thereby enjoying any movie or any music at any time without waiting time.

The aim to provide the information distribution system and the information distribution method in which the hit ratio of header files for playing contents, without waiting time, distributed from the information distribution site is raised to a practical level so as to surely appreciate the contents which are desired to be viewed and listened to without the waiting time, is attained by automatically selecting the header files of the contents in accordance with the preference of the user of the data terminal, in advance, and transmitting them from the content distribution apparatus to the data terminal so as to be stored.

Additional features and advantages of the present invention are described in, and will be apparent from, the following Detailed Description of the Invention and the figures.

BRIEF DESCRIPTION OF THE FIGURES

FIGS. 2A and 2B show a structure of a body data file.

FIGS. 3A and 3B are tables showing relationships between a length (or a number) and a capacity for audition files, header files, and body data files.

FIG. 4 is a flowchart showing a playback procedure for the body data file in a data terminal as shown in FIG. 1.

DETAILED DESCRIPTION OF THE INVENTION

Figure 1:
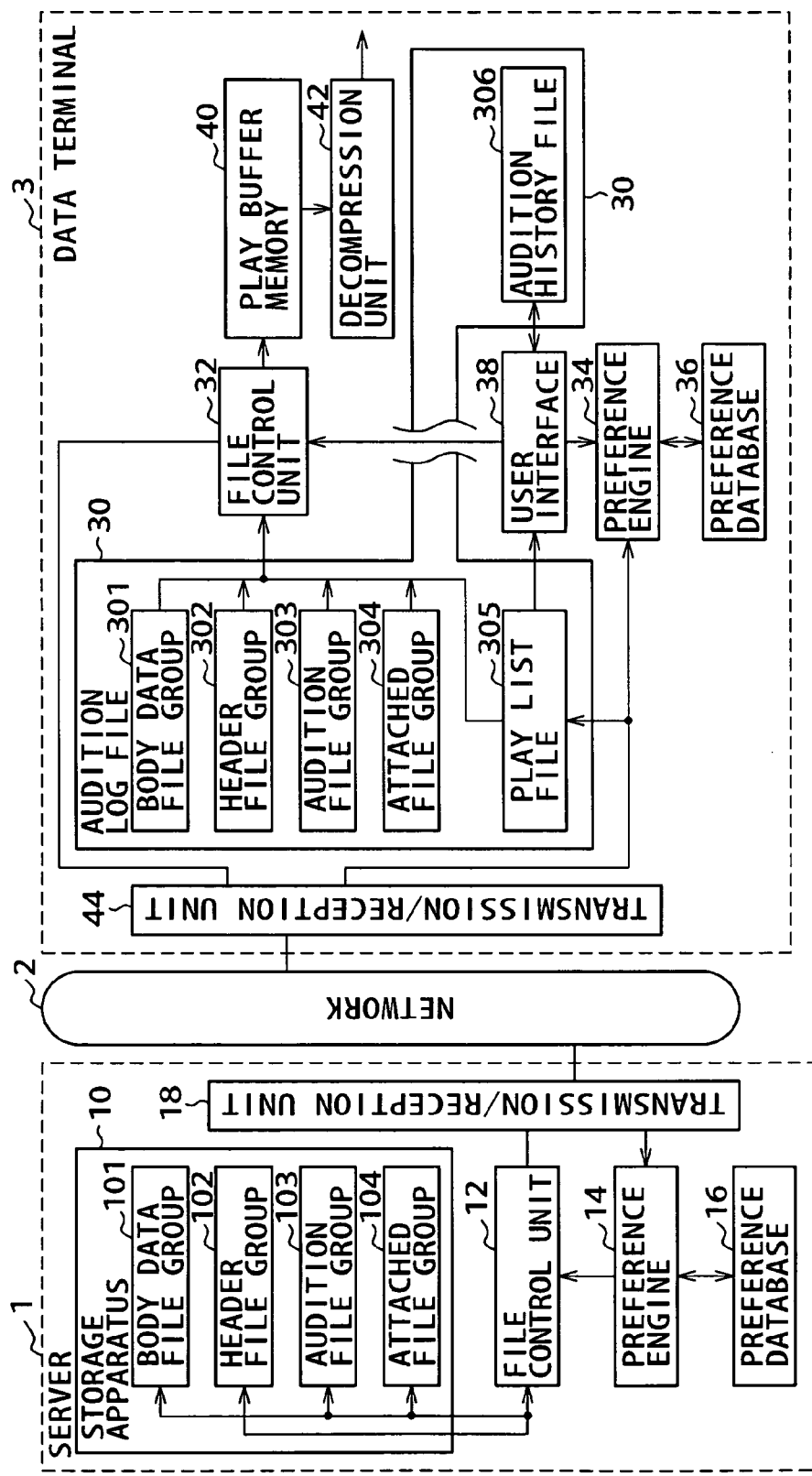
FIG. 1 is a block diagram showing a structure of an information distribution system in accordance with a preferred embodiment of the present invention.

The present invention relates to an information distribution system and an information distribution method for distributing contents such as video images, music, and the like to a data terminal through a network.

FIG. 1 is a block diagram showing a structure of the information distribution system in accordance with a preferred embodiment of the present invention. A content distribution system is configured in which a server 1 constituting a music distribution site on a service provider side is connected to a data terminal 3, such as a personal computer, on a customer (may be referred to as a user) side over a network 2, such as the Internet.

The server 1 includes a body data file group 101, a header file group 102, an audition file group 103, an attached file group 104, a file control unit 12, a preference engine 14, a preference database 16, and a transmission/reception unit 18, and the body data file group 101, the header file group 102, the audition file group 103, and the attached file group 104 are included in a storage device 10, such as a HDD (Hard Disk Drive).

The network 2 is a routing line, wherein the server 1 of the service provider side and the data terminal 3 of the customer side are connected, the service provider side and the customer side exchanges contents after encryption while authenticating each other, and information relevant to the customer's preference is transmitted to the service provider side. Although there is the Internet as an example, it is not limited to it. It may be constituted by a recording media, such as a hard disk, an optical disk, semiconductor memory, an electromagnetic wave media, such as broadcast or a mobile phone, or a combination of a network and a recording medium and the like.

The data terminal 3 includes a body data file group 301, a header file group 302, an audition file group 303, an attached file group 304, a play list file 305, an audition log file 306, a file control unit 32, a preference engine 34, a preference database 36, a user interface 38, a play buffer memory 40, a decompression unit 42, and a transmission/reception unit 44. The body data file group 301, the header file group 302, the audition file group 303, the attached file group 304, the play list file 305, and the audition log file 306 are included in a storage device 30, such as a HDD. For example, the data terminal 3 may be a personal computer, a home server, a dedicated reception terminal, and the like. As shown in the figures, one data terminal 3 is illustrated, but it shall be appreciated that a number of data terminals can be connected to the network 2. An example of a content distribution apparatus includes the server 1, an example of a network includes the network 2, an example of a data terminal includes the data terminal 3, an example of first preference information storage mechanism includes the preference database 16, an example of first selection mechanism includes the preference engine 14, an example of distribution mechanism includes the file control unit 12 and the transmission/reception unit 18, an example of second preference information storage mechanism includes the preference database 36, an example of second selection mechanism includes the preference engine 34, an example of provision mechanism includes the preference engine 34 and the transmission/reception unit 44, and an example of a storage mechanism includes the storage device 30.

The body data file group 101 stores the body data of the contents which are provided for the customer side. The header file group 102 stores the header files to be sent to the customer side beforehand so that the playback of the body data can be started by the customer side instantaneously. The file control unit 12 reads the body data file from the body data file group 101, and sends it to the data terminal 3 of the customer side over the network 2 through the transmission/reception unit 18.

The header file group 102 is a storage area for the header files to be sent to the data terminal 3 of the customer side beforehand so that the playback of the body data of music can be started at the data terminal 3 of the customer side instantaneously. The file control unit 12 reads the header file from the header file group 102, and sends it to the data terminal 3 of the customer side over the network 2 through the transmission/reception unit 18.

The audition file group 103 has files to be viewed or listened to by way of trial, in order that the customer may select contents. The file control unit 12 reads the audition file from the audition file group 103, and sends it to the data terminal 3 of the customer side over the network 2 through the transmission/reception unit 18. In this case, when the audition file is played at the data terminal 3, a button for playing the body data is provided for the user interface 38. By way of the audition file as an entry point, a series of operations such as from downloading of the header file of the music piece of the audition file to downloading of the body data for playing are started, as will be described later.

The attached file group 104 includes files having collected data relevant to the contents. The file control unit 12 reads an attached file from the attached file group 104, so as to be sent to the data terminal 3 of the customer side over the network 2 through the transmission/reception unit 18.

The file control unit 12 reads the audition files selected by the preference engine 14 from the audition file group 103 in the order of priority, and sends them to the data terminal 3 of the customer side over the network 2 through the transmission/reception unit 18.

The preference engine 14 determines the priorities of the contents in accordance with preferences of each customer, taking into consideration the customer's specification, a viewing log, information from the customer, external information, etc. Sometimes, an artificial judgment may also be taken into account. If the storage capacity of the data terminal 3 of the customer side is large and storage area is large, then the priorities may not require so much higher accuracy. For example, as for music, if there is 100 G bytes of storage area on the customer side, 50,000 music pieces can be selected. In addition, the collection of customer information may be limited in view of the customer's privacy.

The preference database 16 is set up in the storage device 10, an external storage device connected by a LAN, and the like stores customer data (customer's preferences and their priorities), the viewing log, and distribution records corresponding to the customer name. In that case, in order to avoid a leakage problem, it is preferable to encrypt the stored data. Further, in view of correlation for each customer, it is possible to raise an accuracy in priority determination of contents by way of so-called cooperation filters which extract a group having many common factors. Furthermore, a priority may be raised according to an external factor (for example, "being often played, by being used on commercials, a drama, a motion picture, and the like or being popular") is also performed.

Under control of the file control unit 32, the header file group 302 stores or eliminates a header file of the header segment in each content.

Under control of the file control unit 32, the audition file group 303 stores or eliminates an audition file for auditing in each content.

Under control of the file control unit 32, the attached file group 304 stores or eliminates an attached file of related information in each content.

The play list file 305 stores a play list of for selecting contents to play. The file control unit 32 selects the contents to be played according to the play list.

The user interface 38 causes the file control unit 32 to execute the request for playback or stop from a user, to carry out marking of a preference degree of contents according to the user's instructions and sending to the preference engine 34, and to send a play log to the preference engine 34.

The preference engine 34 sends the information data acquired from the user interface 38 to the preference database 36, stores the information data therein, and selects an audition file and a header file, based on the information data in the preference database 36. Basically, the user does not perform a direct input, but the preference engine 34 generates a select list automatically Further, the preference engine 34 determines that the contents required by the user to be played would be in accordance with the user's preferences, or presumes the contents which the user probably would desire in the future, based on the correlation between ones whose preferences are alike, cooperating with the preference database 36.

The preference database 36 includes a memory space which stores the information data for presuming that contents played many times would be in accordance with the user's preferences, or presenting the preference engine 34 with a playback situation for causing it to know that the preference degree would be high while the playback frequency of the contents is increasing. In that case, the preference database 36 is prepared with reference to presumption that a low preference degree might have caused the user to stop the audition on the way and to move to the following contents, etc.

The file control unit 32 downloads each file of the content selected by the preference engine 14 from the server 1, stores the file in the storage device 30, or eliminates a content regarded as having a low preference priority from the storage device 30.

The play buffer memory 40 is a memory which temporarily stores file data, in order to make smooth a connection part for connecting to the body data downloaded based on the header file, and a connection part where the stored files are physically discrete.

Since each content is compressed in order to improve a transmission speed via the network 2 and storing efficiency of the contents, the decompression unit 42 decompresses it at the time of playback. A compression ratio and a compression method may be changed depending on the content. Further, the content may not be compressed. In that case, the content data passes through the decompression unit 42. When the content is an audio data, a number of channels is 2 or 5.1 depending on the content.

The audition log file 306 stores playback information, as an audition log, about the number of playback times of the audition file or the body data file, whether it is played from the beginning to the last, etc. The stored information is used as a factor for recognizing the preferences. The body data file played frequently has a high degree of preference. When the body data file is once played, the degree of preference is medium. When the audition file is played, but the body data file is not played, then the degree of preference is considered to be low. In the case of music, a music piece having a favorable preference is played repeatedly. However, there is a factor of growing tired if a certain amount of frequency is exceeded, so that a time factor is also added to the audition log. When a frequency increases with time, the preference degree is high. When a frequency decreases, it is understood that the customer has felt tired. Since it is not often the case that the contents, such as a motion picture, are watched a plurality of times, it is not often the case that a frequency factor is used, compared with the music contents.

As described above, in the system of the present preferred embodiment, four types of files, such as the body data file, the header file, the audition file, and the attached file are handled. In one example embodiment, a first file is the body data file, a second file is the header file and a third file is the audition file or the attached file. Since these files are basic elements, each file will be described in more detail hereafter.

FIGS. 2A and 2B show structures of the body data file. FIG. 2A is the body data file, from T1t to Tce. A header segment 1 includes data from T1t to T1e in the body data file. A header segment 2 includes data from T1t to T2e. The header segment 1 and the header segment 2 constitute the data of the header file. An audition file segment has data from Tpt to Tpe, which constitutes the data of the audition file. FIG. 2B is a table indicating each of the above-mentioned file segments in a time sequential manner.

The length of a header segment is determined according to network environments and a degree of necessity of Qos (Quality of service). If the network environments can be classified, and the header segment has a plurality types of lengths, then an economical efficiency may be compatible with the Qos in a storage space. Therefore, in the example of FIGS. 2A and 2B, there are provided the header segment 1 and the header segment 2.

When instructions to play the contents are received, the playback starts with the header file. At this time, there is a need for a sufficient length for changing smoothly so as to be seamless (or not audible for the seam) when moving to playback of the downloaded body file through the network 2 from the server 1. This length is necessary for preventing the playback from interrupting or freezing, and serves for a data to be stored temporarily in the play buffer memory 40

The length above mentioned may be 10 seconds as a time unit in order to avoid complexity of connection with the body data file. When preparing several types of lengths, it is preferable to make the unit time coarse, such for each five seconds. It is convenient if the lengths are those of the integral multiple of a packet for transmission or a storage device.

The audition file represents the content so as to help the user to carry out selection, so that a part of a content or a specially edited audition file is used. In the case of a music content, it may be possible to use the header file as the audition file. In the case of a video content, the audition file may be read as a preview file for a trial, which is used for roughly understanding the content, checking whether the content is in accordance with the preferences, interesting in the content, etc. When diverting an ID (identification number) for accessing the body data file, it is also possible to select the ID and a timing data of the body data, eliminate the data of the contents, and use the storage space effectively, after downloading the body data.

Various contents can be accessed by using a URL as a key on the Internet, then the audition file is arranged to be a URL function for the content and such that the content can be roughly recognized at the same time. A link button on the homepage provided by the server 1 may have a function for getting access to the audition file. In this case, if the audition file is stored beforehand on the user side, the access can be achieved instantaneously.

Not only in the Internet but in broadcasting, if a similar link button is arranged or the link button is subject to record a book mark, it is very convenient to have access to the contents. Since the audition file originally has a meaning as a feature for selling the contents, it is not often the case to charge. In contrast, it can be considered to give incentives to the user side for having the body data file viewed. Only when the audition file is viewed or listened to, and the body data file is accessed, a fee collection process is carried out as needed in an embodiment. In the case of an advertisement without fee collection, or a monthly charge (yearly charge, daily charge, etc.) method, the number of times of playing the contents is counted.

The attached file is a file having included therein an information data group relevant to a content, such as the attached data of the content, a title, a creator name, a composer, a songwriter, a producer, a director, a player, an actor, an original author, and comments on the content, explanation of a scenario, a picture, and a video. It is usual to download the audition file, the header file, and the attached file, as one set from the server 1 to the data terminal 3.

Since the body data files are large, a file to be possibly frequently used is left preferentially in order to effectively use a limited storage area of the data terminal 3 of the customer side. A strategy of determining the contents to be stored has many items to be considered. A segment which can be shared by the header file and the audition file may not be stored.

The play list file 305 is a file having stored therein data for selecting the contents to be played from a huge volume of contents stored in the storage device 10, and determining the order. An example is shown in tables of FIGS. 3A and 3B, where music contents are actually stored in a 100 G bytes hard disk, and any of them can be selected from 100,000 music pieces and played instantaneously. However, in FIG. 3A, each music piece is compressed by way of MP3, AAC, ATRAC, etc., so as to be set to 128 kbps. In FIG. 3B, for a piece of music, the audition file has 0.48 M bytes, the header file has 0.16 M bytes, and the body data has 4.8 M bytes.

When the header files for 50,000 music pieces are stored in the data terminal 3, the play list is needed, because it is difficult for the user to select one of music pieces to be played appropriately from 50,000 music pieces. Like the conventional concept, the list may be a list on a per album basis, a list of pieces viewed or listened to in recent years, a list in accordance with a hit chart, a play list in which pieces are classified into genres, or a list in which playing music pieces are exchanged in order, taking into account at random to some extent, so as to prevent the user from getting tiresome.

FIG. 3A shows relationships among storing capacity and the length (time) of the audition file, the header file, and the body data file. FIG. 3B shows relationships among the storing capacity the respective numbers of the audition files, the header files, and the body data files. The data of 100,000 header files, 100,000 audition files, and 5,000 music pieces of body data files are accommodated in 88 G bytes. Within 100,000 music pieces, the playback will start instantaneously. However, the number of music pieces currently circulated all over the world exceeds one million, and it will continue increasing. Then, in accordance with the user's preferences, the audition files and the header files of the contents to be possibly requested by the user are automatically selected and downloaded beforehand to the data terminal 3 to be stored. A group of these files is referred to as an index archive. Many factors will be incorporated when constructing the index archive. The constituent factors will be described below accounting to an embodiment.

1. Favorite questionnaires of users, such as a musician, a singer, a music title, generation, a genre, a country, an area, a director, an actor, and a genre (violent, homely, educational, leisurely, a history, artistic and the like).
2. Viewing and listening log. A genre is presumed by checking and guessing correlation with other users (co-operation filters).
3. Indirect information, such as a subscribing magazine, an address, career, and the like.
4. Social information, such as popular or hit contents, recommendations from critics, broadcasting and commercials, and the like.
5. Direct entry information such as titles of favorite contents via broadcasting and the like directly inputted by the user. An example will be shown below in which the user can input the information only by pushing (clicking) a button. The button is pushed (clicked) when the link button is assigned to the broadcasting. When marking of the data, such as a content title, can be interactively carried out like digital broadcasting, a button is prepared which stores broadcasting time and a broadcasting station name, so as to refer to the database of a broadcast log. For example, a broadcast signal is sampled to extract a feature amount, and thus obtained feature amount is referred to the database where the feature amounts are linked beforehand to content titles, so as to find a content title.

Next, a method in an embodiment will be described in which a service provider constructs an index archive for each customer. The service provider collects data from customers, and prepares an archive for each customer. Based on questionnaires, play logs, and genres, the contents relating to one another or having common factors, such as authors, are formed into an archive automatically, semi-automatically, or manually. The archive is prepared not for every customer, but the customers are grouped to some extent. The customers may be grouped into those having similar preference factors. The archive is prepared by using a magazine model. Like a magazine of interest, an editor (publisher) collects information, gathers recommendation contents, and provides the information.

Next, a method in an embodiment will be described in which the index archive is transmitted from the service provider side to the customer side. It is transmitted from the server 1 to the data terminal 3 over the network 2. At first, a lot of data are transmitted. Subsequently, an updated portion will be transmitted.

It is sent by way of a physical media, such as a disk. The number of types can be reduced when the customers are grouped to some extent. It is reasonable that the customer first causes the storage device 30 of the data terminal 3 to read therein the index archive recorded on the disk, then an individuality portion for every customer is sent from the server 1 over the network 2. There is also a distribution method like a monthly magazine.

Now, how to store the body data file in the data terminal 3 will be described in an embodiment. It is not necessary to store the body data file in the storage device 30 from a viewpoint that the playback starts immediately after the playback is instructed through the user interface 38 of the data terminal 3. However, the body data file needs to be stored when the body data is not played sequentially from the beginning, but played by way of fast forward, rewind, and the like. Further, a temporary content may not be downloaded to the data terminal 3 over the network 2, so that it is preferable for the user to store the body data file of an important content.

The play list file 305 includes information indicating whether or not the body data is stored locally (stored in the data terminal 3). When the content is played, the information is displayed on the user interface 38 so as to indicate whether the content is received through the network 2 or from a local storage (the storage device 30). When it is unlikely that the stored content can be downloaded, it is preferable that the information indicating it is sent through the network 2 from the server 1 on the service provider side to the data terminal 3 and displayed on the user interface 38, alternatively at the time of erasing the body data file, the above-mentioned information is displayed on an erase screen displayed on the user interface 38 so as not to be erased easily. Further, when erasing the body data files, in view of play logs the orders of erasing are raised in the body data file group 301 for those which are not played in recent years, and those where time passes since they are stored.

Here, the play list is needed, because it is difficult for the user to select music pieces to be played appropriately from 50,000 music pieces when the header files of 50,000 music pieces are stored in the data terminal 3, for example. Like the conventional concept, the list may be a list on a per album basis, a list of pieces viewed or listened to in recent years, a list in accordance with a hit chart, a play list in which pieces are classified into genres, or a list in which randomicity is taken into account to some extent so as to prevent the user from getting tiresome.

Next, an example of an operation of the present preferred embodiment will be described. When having access to the server 1 through the network 2 from the data terminal 3 of the customer side, the preference engine 14 of the server 1 reads the preference information of the currently accessing customer from the preference database 16, selects the header files to be sent to the customer based on them, and notifies the file control unit 12 of them.

The file control unit 12 reads the corresponding header files from the header file group 102 based on the notified selection information, and transmits them to the data terminal 3 via the network 2 through the transmission/reception unit 18. The file control unit 32 of the data terminal 3 stores the header files received by the transmission/reception unit 44 in the header file group 302 of the storage device 30. Each time there is a chance, such a header file is transmitted. The header files of the music pieces in accordance with the user's preferences are stored gradually and automatically in the header file group 302 of the data terminal 3 in the order of priority.

The method is described above in which the header files selected by the server 1 side are transmitted to the data terminal 3 so as to construct the index archive in the data terminal 3. Next, a method in an embodiment will be described in which the data terminal 3 side requires the server 1 side to transmit the body data desired to be stored in its own terminal and a file relevant thereto, so as to construct the index archive.

If there is vacant time during a period when the data terminal 3 is connected to the server 1 side through the network 2, then the preference engine 34 selects the body data desired to store in the data terminal 3, based on the user's preference information stored in the preference database 36, and notifies the file control unit 32 of them. The file control unit 32 issues a transmission request via the network 2 to the server 1 for transmitting the selected body data in the order of priority.

Thus, the file control unit 12 of the server 1 reads the body data file required to be transmitted and the header file relevant thereto, the relevant audition file, and the relevant attached file, and transmits these files through the network 2 to the data terminal 3 one by one. The file control unit 32 respectively stores the received body data, the header file, the audition file, and the attached file in the body data file group 301, the header file group 302, the audition file group 303, and the attached file group 304, whereby the index archive is automatically constructed according to the request from the data terminal 3 side.

On the other hand, the user accesses a homepage of the site provided by the server 1 through the network 2 to the data terminal 3 so as to listen to music. If the audition button for a music piece which is displayed on the user interface 38 and to which the user wants to listen to first is pushed, this information is transmitted through the network 2 from the transmission/reception unit 44 to the transmission/reception unit 18 of the server 1. The file control unit 12 of the server 1 reads the audition file requested by the customer out of the audition file group 103, and transmits it from the transmission/reception unit 18 to the data terminal 3 over the network 2.

Immediately after storing the audition file received at the transmission/reception unit 44 in the audition file group 303, the file control unit 32 of the data terminal 3 reads and sends it through the play buffer memory 40 to the decompression unit 42 so as to be the audition file having the original length, and plays it by means of a playback system (not shown).

FIG. 4 is a flow chart showing a playback procedure for the body data file in the data terminal 3. The user tries listening until a favorite music piece is found. On finding one, the user pushes the play button for the body data. As the user pushes the play button, a playback instruction is inputted into the file control unit 32 (step S1). The file control unit 32 searches the body data file group 301 for the body data file to be played (step S2). If it is the case, the body data is read from the relevant body data file and sent to the decompression unit 42 via the play buffer memory 40 so as to be played (step S7). After the playback is completed, the play log of the audition log file 306 is updated (step S10), and the process is terminated.

When there is not the body data file, the downloading of the body data file to be played is started (step S3). In other words, the file control unit 32 issues a download request for the body data from the transmission/reception unit 44 to the file control unit 12 of the server 1 over the network 2. The file control unit 12 reads the relevant body data file from the body data file group 101, and sends it from the transmission/reception unit 18 to the data terminal 3 over the network 2. The file control unit 32 stores the received body data file in the body data file group 301.

The file control unit 32 starts downloading of the body data file, and searches the header file group 302 for the header file of the body data file (step S4). When it is not found, the file control unit 32 waits for the completion of downloading the body data file (step S8). After the downloading is completed, the relevant body data file stored in the body data file group 101 is read and sent through the play buffer memory 40 to the decompression unit 42 so as to be played (step S9). After the playback is completed, the play log of the audition log file 306 is updated (step S10), and the process is terminated.

On the other hand, when there is the header file, this header file is read from the header file group 302, and sent through the play buffer memory 40 to the decompression unit 42 so as to be played (step S5). Then, the header file is read from the body data file group 301, after the download of the body data file is completed, or even during the downloading. The header file is sent to the play buffer memory 40. Upon the playback of the header file, the body data file is played (step S6). Even if the data of the header file are lost as the playback is carried out, the playback is performed without an interruption, because the body data file is sent to the play buffer memory 40. After the playback is completed, the play log of the audition log file 306 is updated (step S10), and the process is terminated.

In addition, when the body data file is downloaded and played, it is often the case that it is usually charged. If it is the case, the server 1 side counts the number of downloading of the body data file and charges for it. The charges are collected and paid each time, for example monthly, from the account of the customer who is registered in advance. There are various types of fee collection methods. Further, it is often the case that the header file and the audition file are free of charge. Similar methods are also applied when charging for these. Further, another server which is dedicated to fee collection may charge for the files used by customer, and which is on another network independently of the server 1.

Next, when the user does not connect to the music distribution site as described above, but wants to play the body data stored in the body data file group 301 of the storage device 30, the user may select music pieces to which the user wants to listen from the user interface 38 so as to play the music pieces one by one. However, it is troublesome to look for a music piece desired to listen to one by one from approximately 5,000 music pieces, for example. In that case, an automatic playback is selected from the user interface 38.

When the automatic playback is selected, the preference engine 34 automatically selects a music piece to be played based on the play list of the play list file 305, and notifies the file control unit 32 of it. The file control unit 32 reads the body data file of the music piece selected by the preference engine 34 from the body data file group 301, and sends the read body data file through the play buffer memory 40 to the decompression unit 42. Accordingly, the first music piece selected by the preference engine 34 is played. After the playback of the music piece is completed, the next music piece selected by the preference engine 34 is played in a similar manner as described above. Henceforth, the body data of the music pieces stored in the body data file group 301 are automatically played one by one.

According to a preferred embodiment, when the body data file is downloaded from the server (music distribution site) 1 and played, the header file of the body data to be downloaded which is stored beforehand is played immediately. During the playback, the body data file is downloaded and played, so that the music piece which the user wants to download and to play can be played without waiting time.

In this regard, the header file of the body data downloaded by the user from the music distribution site needs to be stored beforehand in the header file group 302. Based on each user's preferences collected in the preference database 16 within the server 1, the header file is transmitted to the data terminal 3 in advance via the network 2 by way of file transmission according to the transmission request for the body data file and the related file based on the preference of the user on the data terminal 3 side, the index archive is automatically constructed without an intentional operation of the user, and the header files of the music pieces in accordance with the preference of the user (approximately 5,000 music pieces, for example) can be stored automatically. Thus, the most of the header files of the body data downloaded by the user can be stored beforehand in the data terminal 3, and the user can utilize the effect of playing the music piece downloaded and listened to immediately without any interruption.

Further, the music pieces in accordance with the user's preference are automatically selected from the huge number of music pieces stored in the data terminal 3 so as to be played one after another, so that the stored music pieces can be enjoyed without a troublesome operation in selecting every music piece which the user wants to play. In addition, it is often the case that the played music pieces are what the user just wants to listen to, so that the stored music piece can be played and effectively used at the right time. Furthermore, the huge number of music pieces in accordance with the user's preference stored in the above-mentioned data terminal 3 are received and stored beforehand from the server 1 via the network 2, thus performing very efficient distribution.

In addition, although the above-mentioned preferred embodiment is described, assuming the server 1 to be the music distribution site, a motion picture distribution site has substantially the same structure and operation, and therefore has the same effect, except for different numbers of respective files stored in the data terminal 3.

Further, the present invention is not limited to the above-mentioned preferred embodiments, but can be carried out according to other various embodiments, in terms of a particular structure, a function, an operation, and an effect, without departure from the scope of the present invention. For example, when there is a portable terminal co-operable with the data terminal 3 of the above-mentioned preferred embodiment, the play list and the play log can be used also for selecting the contents to be stored in the portable terminal.

For example, it is assumed that the portable terminal carries approximately 3 GB of semiconductor memory. If it is not assumed the downloading is carried out from the network but only the synchronization with the data terminal 3 is considered, then the audition file and the header file are also unnecessary and only the body data is stored, whereby 625 music pieces, each having a four-minute length to play, can be stored at 128 kbps. With reference to the play list, the play log, etc. of the play list file 305 or the audition log file 306, the preference engine 34 selects 625 music pieces automatically out of top ranked music pieces, and transmits them to the portable terminal. Thus, the music pieces reflecting the user's preferences are stored in the portable terminal automatically, and can improve usability of the portable terminal.

In this case, the user may arrange for a specific content to be locked, and a content not having listed automatically may be inputted into a list compulsorily, in order to prevent the content from being deleted during automatic update. The attached file is stored, except for a portion (for example, animation) which is not supported by the portable terminal. Further, assuming the contents to be downloaded, it is envisaged that the portable terminal may also store the audition file and the header file. The header file is unnecessary if the music piece whose the body data is not stored has waiting time to start the playback.

The distribution of the contents is described by way of downloading. Streaming also needs waiting time to store a certain amount of contents in a buffer memory, and therefore benefits from the effect that the header file allows the playback without waiting time.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An information distribution system for distributing at least a first file, a second file and a third file from a content distribution apparatus to a data terminal by way of downloading via a network, the information distribution system comprising:
   the data terminal; and
   the content distribution apparatus comprising:
   (A) a processor; and
   (B) a memory device storing instructions which when executed by the processor, causes the processor to:
      (a) collect and store preference information of a user of the data terminal;
      (b) automatically select, based on the preference information:
         (i) the second file which is assigned to play in an interval between:
            (A) starting downloading the first file to the data terminal; and
            (B) playing the first file at the data terminal; and
         (ii) the third file, the second file being a first type of file, the third file being a different second type of file;
         wherein:
         (i) the first file includes at least one of a video image data and a music data; and
         (ii) the second file includes a portion of the at least one of the video image data and the music data; and
      (c) distribute the selected second file to the data terminal by downloading via the network, wherein the automatically selected second file, which includes said portion of the at least one of the video image data and the music data, and the automatically selected third file are automatically distributed from the content distribution apparatus to the data terminal:
         (i) before the first file starts downloading to the data terminal; and
         (ii) based on an amount of storage associated with the data terminal.

2. The information distribution system of claim 1, wherein the instructions, when executed by the processor, cause the processor to, when distributing the second file, distribute the third file to the data terminal.

3. An information distribution method for distributing a first file, a second file and a third file from a content distribution apparatus to a data terminal by way of downloading via a network, the method comprising:
   collecting and storing preference information, performed by the content distribution apparatus, of a user of the data terminal;
   automatically selecting, based on the preference information:
      (a) the second file which is assigned to playback in an interval between:
         (i) starting downloading the first file to the data terminal; and
         (ii) playing said first file at the data terminal; and
      (b) the third file, the second file being a first type of file, the third file being a different second type of file;
      wherein: (i) the first file includes at least one of a video image data and a music data; and (ii) the second file includes a portion of the at least one of the video image data and the music data; and
   downloading the automatically selected second file and the automatically selected third file to the data terminal so as to distribute via the network, wherein the selected second file, which includes said portion of the at least one of the video image data and the music data, and the automatically selected third file are automatically downloaded from the content distribution apparatus to the data terminal:
      (a) before the first file starts downloading to the data terminal; and
      (b) based on an amount of storage associated with the data terminal.

4. The information distribution system of claim 1, wherein a length of the second file is determined according to network environments and a degree of necessity of quality of service.

5. The information distribution method of claim 3, wherein a length of the second file is determined according to network environments and a degree of necessity of quality of service.

6. The information distribution system of claim 1, wherein said third file includes an audition file which includes another portion of the at least one of the video image data and the music data.

7. The information distribution system of claim 1, wherein said third file includes an attached file which includes collected information which is associated with the at least one of the video image data and the music data.

8. The information distribution system of claim 1, wherein said second file and said third file are automatically downloaded as one set from the content distribution apparatus to the data terminal before the first file starts downloading to the data terminal.

9. The information distribution method of claim 3, wherein said third file includes an audition file which includes another portion of the at least one of the video image data and the music data.

10. The information distribution method of claim 3, wherein said third file includes an attached file which includes collected information which is associated with the at least one of the video image data and the music data.

11. The information distribution method of claim 3, which includes, before the first file starts downloading to the data terminal, automatically downloading said second file and said third file as one set from the content distribution apparatus to the data terminal.

* * * * *